US012609638B2

(12) United States Patent
Kim et al.

(10) Patent No.: US 12,609,638 B2
(45) Date of Patent: Apr. 21, 2026

(54) TRIBOELECTRIC ENERGY GENERATING DEVICE INCLUDING FERROELECTRIC COMPOSITE AND DRIVEN BY ULTRASONIC WAVE

(71) Applicant: RESEARCH & BUSINESS FOUNDATION SUNGKYUNKWAN UNIVERSITY, Suwon-si (KR)

(72) Inventors: SangWoo Kim, Yongin-si (KR); Young Jun Kim, Daejeon (KR); Bo Sung Kim, Suwon-si (KR); Young Wook Chung, Suwon-si (KR); Joon Ha Hwang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 621 days.

(21) Appl. No.: 17/951,293

(22) Filed: Sep. 23, 2022

(65) Prior Publication Data

US 2023/0093932 A1 Mar. 30, 2023

(30) Foreign Application Priority Data

Sep. 27, 2021 (KR) ........................ 10-2021-0126892

(51) Int. Cl.
*H02N 1/04* (2006.01)
*A61N 1/378* (2006.01)
*H02J 7/00* (2006.01)
(52) U.S. Cl.
CPC .............. *H02N 1/04* (2013.01); *H02J 7/0042* (2013.01)

(58) Field of Classification Search
CPC . H02N 1/00; H02N 1/002; H02N 1/04; A61N 1/378; A61N 1/3787; H02J 7/0042
See application file for complete search history.

(56) References Cited

U.S. PATENT DOCUMENTS

| | | | |
|---|---|---|---|
| 2018/0013359 A1* | 1/2018 | Park | H02N 1/08 |
| 2018/0145613 A1* | 5/2018 | Shin | H02N 1/04 |

OTHER PUBLICATIONS

Seung. Boosting Power Generating Performance . . . , Adv. Energy Mater, 2017, pp. 1-8) (Year: 2017).*

(Continued)

*Primary Examiner* — Eric Johnson
(74) *Attorney, Agent, or Firm* — NSIP Law

(57) ABSTRACT

A triboelectric energy generating device including: a first triboelectric layer made of a conductive material; a second triboelectric layer made of the ferroelectric composite, wherein the second triboelectric layer faces and is spaced apart from a friction face of the first triboelectric layer; and an outer wall surrounding at least a portion of each of the first triboelectric layer and the second triboelectric layer. The ferroelectric composite includes a polymer matrix and ferroelectric particles dispersed in the polymer matrix. When the ultrasonic wave is applied to the device, the first triboelectric layer and the second triboelectric layer repeatedly contact and are spaced from each other to generate the triboelectric energy. When the ultrasonic wave is applied to the device, an electric field is generated to maintain a polarized state of the ferroelectric particles to maintain an output of the triboelectric energy.

10 Claims, 4 Drawing Sheets

(56) References Cited

OTHER PUBLICATIONS

Li, Haidong et al., "Enhanced Ferroelectric-Nanocrystal-Based Hybrid Photocatalysis by Ultrasonic-Wave-Generated Piezophototronic Effect", Nano Letters, American Chemical Society, vol. 15, No. 4, 2015, (pp. 2372-2379).

Laiming, Jiang et al., "Ultrasound-induced wireless energy harvesting: From materials strategies to functional applications", Nano Energy, vol. 77, 2020, (25 Pages in English).

Park, Yoojeong et al., "Ferroelectric Multilayer Nanocomposites with Polarization and Stress Concentration Structures for Enhanced Triboelectric Performances", American Chemical Society Nano, vol. 14, No. 6, 2020, (pp. 7101-7110).

* cited by examiner

| | Upper surface | Pristine | Lower surface |
|---|---|---|---|
| P(VDF-TrFE):BTO | -1.18 V | -303 mV | 398 mV |

Before ferroelectric nanoparticles are inserted into polymer matrix

After ferroelectric nanoparticles are inserted into polymer matrix

FIG. 9

| wt % | Young's modulus (MPa) |
|------|----------------------|
| 0 | 1044.286 |
| 1 | 1040.921 |
| 2 | 1036.269 |
| 3 | 1037.424 |
| 5 | 1038.961 |

TRIBOELECTRIC ENERGY GENERATING DEVICE INCLUDING FERROELECTRIC COMPOSITE AND DRIVEN BY ULTRASONIC WAVE

CROSS-REFERENCE TO RELATED APPLICATION

This application claims the benefit under 35 USC 119(a) of priority to Korean Patent Application No. 10-2021-0126892 filed on Sep. 27, 2021 in the Korean Intellectual Property Office, the entire disclosure of which is incorporated herein by references for all purposes.

BACKGROUND

Field

The following description relates to a triboelectric energy generating device including a ferroelectric composite and driven by an ultrasonic wave. In particular, the following description relates to a technology that may ensure long-term output stability of an ultrasonic wave-based high-power triboelectric energy generating device for charging a body-implantable medical device.

Description of Related Art

Geriatric diseases caused by aging have become a problem, and a human-body implantable medical device for continuous treatment of the geriatric diseases is attracting attention. An ultrasonic wave-based triboelectric energy generating device for charging the implantable medical device has been developed but has a disadvantage in that it is too bulky to be commercialized. When a volume of the device is large, a site into which the device is inserted is limited and the device inserted into the body causes discomfort in movement.

However, when the device is miniaturized, it is difficult to generate a sufficient electrical energy required to charge the implantable medical device due to the reduced friction area. Due to intrinsic triboelectric properties of currently developed materials, it is difficult to obtain a sufficient electrical output using a very small size of the device.

When an electric field is applied to a ferroelectric material to polarize the material, high output may be obtained due to a coupling effect between a surface charge inherent in the ferroelectric material and charge induction by polarization. Therefore, the ultrasonic wave-based triboelectric energy generating device subjected to polarization treatment and thus having the high output may be minimized. However, there is a problem that the polarization of the ferroelectric material decreases over time.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a triboelectric energy generating device driven by an ultrasonic wave includes: a first triboelectric layer made of a conductive material and serving as a first electrode; a second triboelectric layer made of the ferroelectric composite, wherein the second triboelectric layer faces and is spaced apart from a friction face of the first triboelectric layer; and an outer wall surrounding at least a portion of each of the first triboelectric layer and the second triboelectric layer, wherein the ferroelectric composite includes a polymer matrix and ferroelectric particles dispersed in the polymer matrix, wherein when the ultrasonic wave is applied to the device, the first triboelectric layer and the second triboelectric layer repeatedly contact and are spaced from each other to generate the triboelectric energy, and wherein when the ultrasonic wave is applied to the device, an electric field is generated to maintain a polarized state of the ferroelectric particles to maintain an output of the triboelectric energy.

When the ultrasonic wave is applied to the device, a pressure may be momentarily concentrated at an interface between the polymer matrix and the ferroelectric particles due to a difference between acoustic impedances of the polymer matrix and the ferroelectric particles, and thus the electric field may be generated by the pressure, and thus, under the electric field, electric charges may be trapped in a defect to induce a stronger polarization, and the electric field may maintain the polarized state of the ferroelectric particles.

The polymer matrix may include a ferroelectric polymer, and the ferroelectric particles may be subjected to polarization treatment.

The device further may include a second electrode disposed opposite to a friction face of the second triboelectric layer.

In another general aspect, a triboelectric energy generating device driven by an ultrasonic wave includes: a first triboelectric layer made of a non-conductive material; a first electrode disposed on a non-friction face of the first triboelectric layer; a second triboelectric layer made of a ferroelectric composite, wherein the second triboelectric layer faces and is spaced apart from a friction face of the first triboelectric layer, wherein the friction face and the non-friction face of the first triboelectric layer are opposite to each other; and an outer wall surrounding at least a portion of each of the first triboelectric layer and the second triboelectric layer, wherein the ferroelectric composite includes a polymer matrix and ferroelectric particles dispersed in the polymer matrix, wherein when the ultrasonic wave is applied to the device, the first triboelectric layer and the second triboelectric layer repeatedly contact and are spaced from each other to generate the triboelectric energy, and wherein when the ultrasonic wave is applied to the device, an electric field is generated to maintain a polarized state of the ferroelectric particles to maintain an output of the triboelectric energy.

When the ultrasonic wave is applied to the device, a pressure may be momentarily concentrated at an interface between the polymer matrix and the ferroelectric particles due to a difference between acoustic impedances of the polymer matrix and the ferroelectric particles, and thus the electric field may be generated by the pressure, and thus, under the electric field, electric charges may be trapped in a defect to induce a stronger polarization the electric field may maintain the polarized state of the ferroelectric particles.

The polymer matrix may include a ferroelectric polymer, and the ferroelectric particles may be subjected to polarization treatment.

The device may include a second electrode disposed opposite to a friction face of the second triboelectric layer.

A charging device may be insertable into a human body for charging a medical device implanted into the human body, and the charging device may include the triboelectric energy generating device.

When the charging device is inserted into the human body, the ultrasonic wave from an outside may be applied to the triboelectric energy generating device of the charging device to generate the electric field to maintain the polarized state of the ferroelectric particles to maintain the output of the triboelectric energy.

Other features and aspects will be apparent from the following detailed description, the drawings, and the claims.

BRIEF DESCRIPTION OF DRAWINGS

FIG. 9 is data on mechanical properties of a triboelectric layer based on a concentration of ferroelectric nanoparticles.

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTIONS

Figure 1:
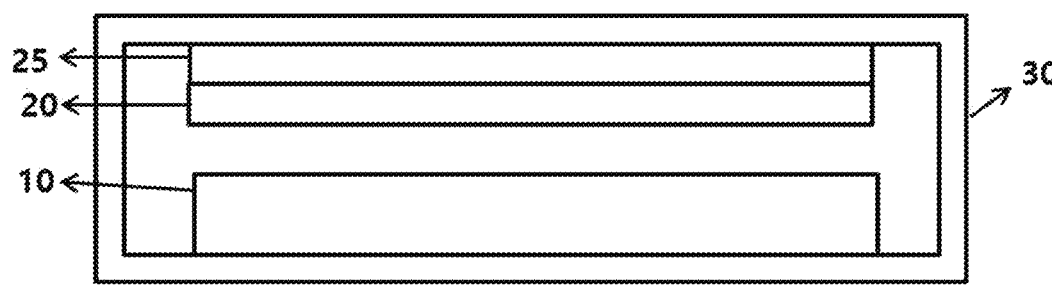
FIG. 1 and FIG. 2 are respectively schematic diagrams of triboelectric energy generating devices according to an example, each generator including a ferroelectric composite and driven by an ultrasonic wave.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may include within the idea and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the idea and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter.

As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Hereinafter, embodiments according to the technical idea of the present disclosure will be described with reference to the accompanying drawings.

The present disclosure discloses a new approach for securing a technology for stably charging a human body-implantable device with an ultra-small ultrasonic wave-based triboelectric energy generating device for a long period of time, and for maintaining a high output of an ultrasonic wave-based triboelectric energy generating device. To this end, a system according to the present disclosure includes an ultrasonic wave-based triboelectric energy generating device manufactured using a human-compatible polymer nanocomposite with ferroelectricity and an ultrasonic wave transducer that generates ultrasonic waves. More specifically, the present disclosure relates to the ultrasonic wave-based triboelectric energy generating device.

Figure 2:
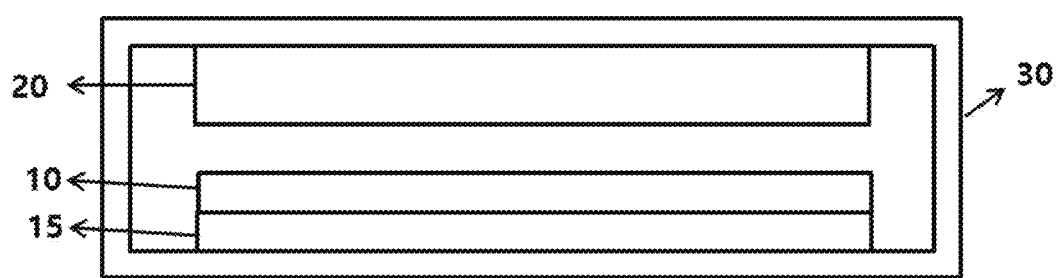

FIG. 1 and FIG. 2 are respectively schematic diagrams of triboelectric energy generating devices according to an example, each generator including a ferroelectric composite and driven by an ultrasonic wave.

Referring to FIG. 1, a triboelectric energy generating device including a ferroelectric composite and driven by an ultrasonic wave may include a first triboelectric layer 10 made of a conductive material and serving as a first electrode; a second triboelectric layer 20 disposed to face a friction face of the first triboelectric layer and spaced apart therefrom and made of a ferroelectric composite; and an outer wall 30 surrounding a portion or an entirety of each of the first triboelectric layer and the second triboelectric layer. In this case, the relative positions of the first triboelectric layer and the second triboelectric layer may vary.

Figures 5, 6:
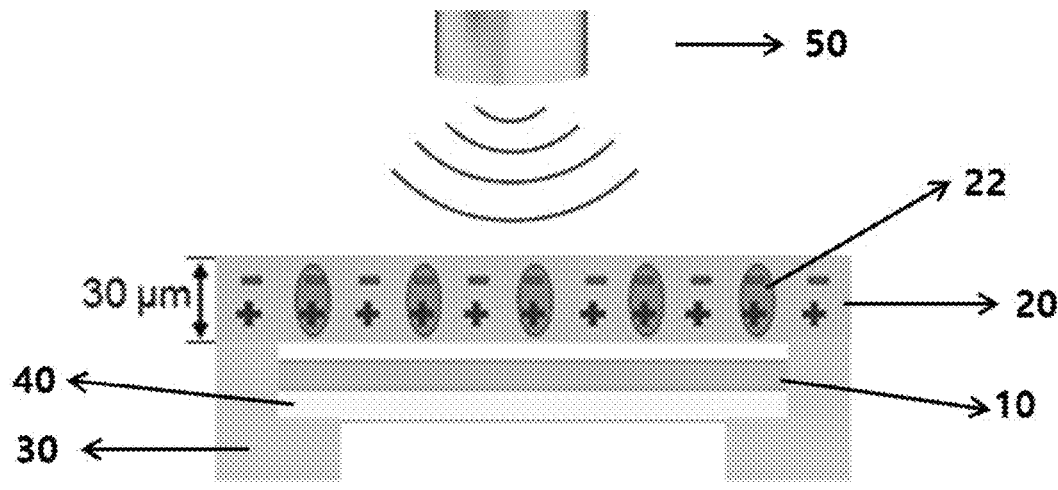
FIG. 5 shows a structure and an operating principle of an ultrasonic wave-based triboelectric energy generating device with long-term stable operation ability via polarization and maintenance thereof under an ultrasonic wave.
FIG. 6 shows a surface potential of each of an upper surface of a ferroelectric nanocomposite after applying the ultrasonic wave to the ferroelectric nanocomposite, a surface not subjected to the ultrasonic wave, and a lower surface thereof after applying the ultrasonic wave thereto.

The ferroelectric composite may include a polymer matrix and ferroelectric particles 22 contained therein. As shown in FIG. 5, the ferroelectric particles 22 are dispersed in the polymer matrix. In order to drive the triboelectric energy generating device, an electric field is first applied to the ferroelectric particles to polarize the ferroelectric particles. In one example, the polymer matrix preferably includes a ferroelectric polymer.

The ferroelectric polymer matrix may include P(VDF-TrFE), PVDF, P(VDF-TrFE-CFE), or P(VDF-TrFE-CTFE). The ferroelectric particles may include BTO (Barium titanate), KNN (Potassium-sodium niobate), lithium niobate (LN), bismuth ferrite (BFO), etc.

In one example, the ferroelectric particles may be subjected to polarization treatment.

In accordance with an example, the ultrasonic wave is applied to maintain the polarized state of the ferroelectric particles to maintain a high output of the triboelectric power generation device. The ultrasonic wave may generate acoustic cavitation bubbles from gas nuclei present in a fluid and may destroy the bubbles. When the acoustic cavitation bubbles are destroyed, very high pressures (about 100 Mpa) and electric fields (about 100 kV/m) may be generated.

This principle may also be applied to the polymer-particle composite. A pressure is momentarily concentrated at an interface between the polymer and the particle due to a difference between acoustic impedances of the two materials, and an electric field is generated by the pressure. Thus, under the electric field, electric charges are trapped in a defect to induce a stronger polarization. Further, an electric field generated by the ultrasonic wave plays a role in maintaining the previously generated polarization.

That is, when the ultrasonic wave is applied to the triboelectric energy generating device including the ferroelectric composite and driven by an ultrasonic wave in accordance with the present disclosure, the first triboelectric layer and the second triboelectric layer may repeatedly contact and are spaced from each other to generate triboelectric energy. Further, when the ultrasonic wave is applied thereto, the electric field may be generated to maintain the polarized state of the ferroelectric particles, thereby maintaining the output of the triboelectric energy. That is, in accordance with the present disclosure, a larger output is generated due to mechanical vibration in a state in which a surface charge is generated on the triboelectric layer made of the ferroelectric composite.

Further, as shown in FIG. 2, the device may further include a second electrode 25 disposed on a face opposite to the friction face of the second triboelectric layer 20 (the face opposite to the first triboelectric layer).

The outer wall 30 may surround an entirety of each of the first triboelectric layer and the second triboelectric layer as shown in FIG. 1 and FIG. 2, or may surround only a portion of the first triboelectric layer as shown in FIG. 5.

Figure 3:
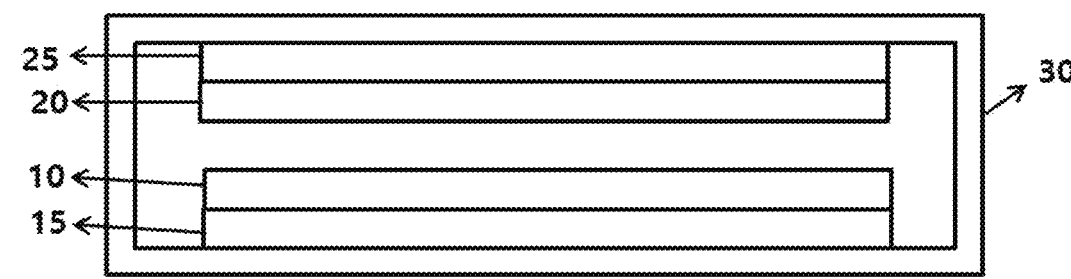
FIG. 3 and FIG. 4 are respectively schematic diagrams of triboelectric energy generating devices according to further examples, each generator including a ferroelectric composite and driven by an ultrasonic wave.
Figure 4:
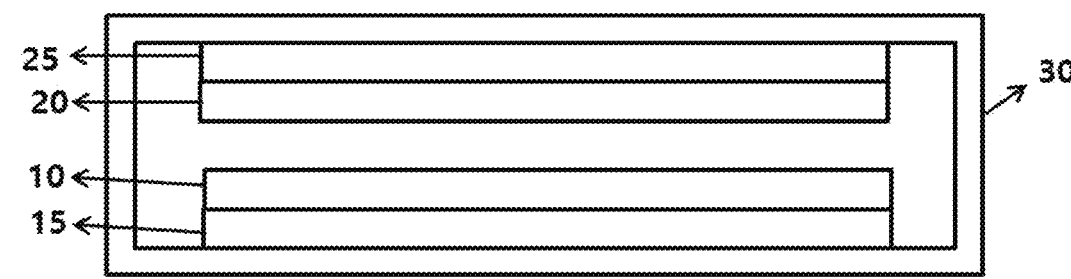

FIG. 3 and FIG. 4 are respectively schematic diagrams of triboelectric energy generating devices according to further examples, each generator including a ferroelectric composite and driven by an ultrasonic wave.

In the examples of FIG. 3 and FIG. 4, the first triboelectric layer 10 is made of a non-conductive material, and does not act as the first electrode, while the device further includes a separate first electrode 15 other than the first triboelectric layer 10. This is main a difference between the examples of FIGS. 1 and 2 and the examples of FIG. 3 and FIG. 4. Thus, redundant descriptions will be omitted.

The triboelectric energy generating device including a ferroelectric composite and driven by an ultrasonic wave may include the first triboelectric layer 10; the first electrode 15 disposed on the first triboelectric layer 10; the second triboelectric layer 20 disposed to face the friction face of the first triboelectric layer and spaced apart from the friction face and made of the ferroelectric composite; and the outer wall 30 surrounding a portion or an entirety of each of the first triboelectric layer and the second triboelectric layer.

The ferroelectric composite may include a polymer matrix and ferroelectric particles 22 contained therein. As shown in FIG. 5, the ferroelectric particles 22 are dispersed in the polymer matrix. In order to drive the triboelectric energy generating device, an electric field is first applied to the ferroelectric particles to polarize the ferroelectric particles. In one example, the polymer matrix preferably includes a ferroelectric polymer.

The ferroelectric polymer matrix may include P(VDF-TrFE), PVDF, P(VDF-TrFE-CFE), or P(VDF-TrFE-CTFE). The ferroelectric particles may include BTO (Barium titanate), KNN (Potassium-sodium niobate)), lithium niobate (LN), bismuth ferrite (BFO), etc.

In accordance with an example, the ultrasonic wave is applied to maintain the polarized state of the ferroelectric particles to maintain a high output of the triboelectric power generation device. The ultrasonic wave may generate acoustic cavitation bubbles from gas nuclei present in a fluid and may destroy the bubbles. When the acoustic cavitation bubbles are destroyed, very high pressures (about 100 Mpa) and electric fields (about 100 kV/m) may be generated.

This principle may also be applied to the polymer-particle composite. A pressure is momentarily concentrated at an interface between the polymer and the particle due to a difference between acoustic impedances of the two materials, and an electric field is generated by the pressure. Thus, under the electric field, electric charges are trapped in a defect to induce a stronger polarization. Further, an electric field generated by the ultrasonic wave plays a role in maintaining the previously generated polarization.

That is, when the ultrasonic wave is applied to the triboelectric energy generating device including the ferroelectric composite and driven by an ultrasonic wave, the first triboelectric layer and the second triboelectric layer may repeatedly contact and are spaced from each other to generate triboelectric energy. Further, when the ultrasonic wave is applied thereto, the electric field may be generated to maintain the polarized state of the ferroelectric particles, thereby maintaining the output of the triboelectric energy. That is, in accordance with the present disclosure, a larger output is generated due to mechanical vibration in a state in which a surface charge is generated on the triboelectric layer made of the ferroelectric composite.

The polymer includes a ferroelectric polymer, and the ferroelectric particles are polarized under the electric field.

Further, as shown in FIG. 4, the device may further include the second electrode 25 disposed on a face opposite to the friction face of the second triboelectric layer 20 (the face opposite to the first triboelectric layer 10).

The outer wall 30 may surround an entirety of each of the first triboelectric layer and the second triboelectric layer as shown in FIG. 3 and FIG. 4, or may surround only a portion of the first triboelectric layer as shown in FIG. 5.

The various examples may provide a body-implantable charging device for charging an implantable device into the human body, wherein the charging device includes the triboelectric energy generating device including a ferroelectric composite and driven by an ultrasonic wave as described above. The charging device that may be inserted into the human body may be inserted into the human body and then an ultrasonic wave from an outside may be applied thereto to generate the electric field using the triboelectric energy generating device including the ferroelectric composite and driven by the ultrasonic wave as described above to maintain the polarized state of the ferroelectric particles, thereby maintaining the output thereof.

In one example, each of the parts of the device may be preferably made of a material having biodegradable or time-limited properties inside the human body.

A material of each of the electrodes may include a biodegradable metal or conductive polymer. Examples of the biodegradable metal may include, but are not limited to, a metal material such as Mg and Mo that may be decomposed in a living body.

Further, the outer wall may be made of a porous time-limited material. The porous time-limited material may include, for example, a porous biodegradable polymer such as PHBV, PLA, PCL, etc. However, the various configurations are not limited thereto.

When the ultrasonic wave is applied to the porous time-limited material, an ultrasonic wave energy is concentrated into an air layer in a matrix of the porous material due to a large difference between an acoustic wave resistance of the air layer and an acoustic wave resistance of the matrix of the porous material. However, when an ultrasonic wave with a low intensity is applied thereto, the matrix is not decomposed because the ultrasonic wave energy concentrated into the air layer of the porous material is not large. On the contrary, when an ultrasonic wave with high intensity but non-harmless to the human body is applied thereto, the ultrasonic wave energy concentrated into the air layer is large, so that a pressure caused by the acoustic wave is applied to the matrix of the porous material, such that a portion of the porous time-limited material around the air layer is decomposed.

In accordance with the various examples using the above principle, the outer wall made of the porous time-limited material may be made of an ultrasonic wave selective reaction time-limited material. Thus, when the charging device has been inserted into the human body, the ultrasonic wave having a low intensity is applied to the triboelectric energy generating device of the charging device to generate the electric field to maintain the polarized state. After completion of use thereof, the triboelectric energy generating device may be biodegraded inside the human body by applying ultrasonic wave with high intensity thereto. That is, the porous time-limited material may be the ultrasonic wave selective reaction time-limited material that may be decomposed when the ultrasonic wave with an intensity greater than or equal to a critical intensity at which the decomposition thereof starts is applied to the device. When the ultrasonic wave having the intensity lower than the critical intensity is applied to the device, the first and second triboelectric layers repeatedly contact and are spaced from each other via the application of the ultrasonic wave to generate the triboelectric energy. When the ultrasonic wave having the intensity greater than or equal to the critical intensity is applied thereto, the outer wall made of the porous time-limited material may be decomposed.

An ultrasonic wave transducer 50 in FIG. 5 may generate an ultrasonic wave and transmit the generated ultrasonic wave to the triboelectric energy generating device of the charging device. In general, for medical treatment, a frequency of the ultrasonic wave is in a range of about 20 kHz to 50 kHz, and an intensity of the ultrasonic wave is in a range of about 1 $W/cm^2$. In this case, the critical intensity of the ultrasonic wave at which the porous time-limited material is decomposed may be in a range of about 3 $W/cm^2$ to 5 $W/cm^2$.

Hereinafter, specific examples will be described. However, the various configurations are not limited thereto.

Example 1

FIG. 5 shows a structure and an operating principle of an ultrasonic wave-based triboelectric energy generating device with long-term stable operation ability via polarization and maintenance thereof under an ultrasonic wave.

FIG. 5 shows the first electrode 10 as the first triboelectric layer made of gold; the second triboelectric layer 20 made of a ferroelectric nano composite; the outer wall 30 made of the porous time-limited material; and the ultrasonic wave transducer 50. The outer wall 30 surrounds a portion of the first electrode 10. The first electrode 10 is disposed on a substrate 40. The ferroelectric nanocomposite 20 includes a ferroelectric polymer matrix P(VDF-TrFE) and ferroelectric particles dispersed in the ferroelectric polymer matrix and made of a ferroelectric ceramic BTO (Barium titanate). The polarized state of the ferroelectric particles is shown in FIG. 5.

When the ferroelectric nanocomposite subjected to the polarization treatment via DC poling is used as a friction material for an ultra-small ultrasonic wave-based triboelectric energy generating device having an active area of 8 mm×8 mm, the polarized state of electric dipoles in the nano-composite induces a larger number of surface charges to generate sufficient electrical energy to charge the implantable medical device. Thus, the example may realize the ultra-small ultrasonic wave-based triboelectric energy generating device with a size of 1 cm×1 cm which can generate the electrical energy amount similar to that which a conventional ultrasonic wave-based triboelectric energy generating device with a size of 4 cm×4 cm may generate and which may have long stable operation ability.

This technical validity of the device according to the various examples was experimentally verified by measuring a surface potential via KPFM.

FIG. 6 shows a surface potential of each of an upper surface of a ferroelectric nanocomposite after applying the ultrasonic wave to the ferroelectric nanocomposite, a surface not subjected to the ultrasonic wave, and a lower surface thereof after applying the ultrasonic wave thereto.

FIG. 6 shows data as a comparing result between the surface potential of each of the upper and lower surfaces of the ferroelectric nanocomposite film to which an ultrasonic wave at an intensity of 1 $W/cm^2$ is applied for 1 hour and the surface potential of the film not subjected to the ultrasonic wave. Based on the comparison result, it was identified that the polarization was induced as shown in FIG. 5.

Figure 7:
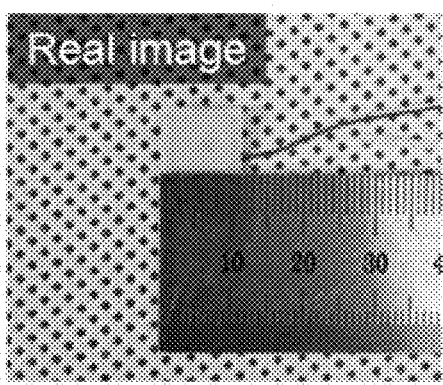
FIG. 7 shows a real image and an electrical output of the ultrasonic wave driven power generation device.
Figure 7:
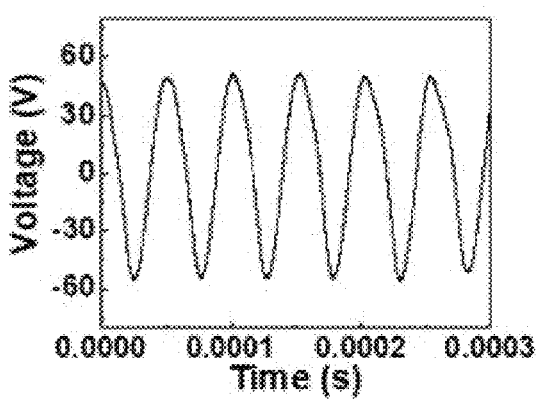

FIG. 7 shows a real image and an electrical output of the ultrasonic wave driven power generation device.

FIG. 7 shows a real image of an ultrasonic wave-driven power generation device with a size of 1 cm×1 cm and data obtained by measuring a voltage generated when an ultrasonic wave having a frequency of 20 kHz and at an intensity of 1 $W/cm^2$ is applied thereto. It was identified that 35.52V based on a RMS value was generated. When this value is compared with an output of a conventional ultrasonic wave-based triboelectric energy generating device, it was identified that the energy conversion efficiency when using the device in accordance with the present disclosure increased by 125 times because the output increased by about 2.6 times even though a size of the device decreased by 16 times and the ultrasonic wave intensity applied thereto decreased by 3 times.

Figure 8:
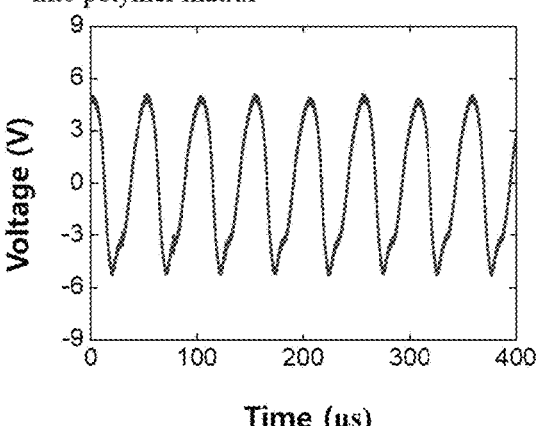
FIG. 8 is a graph showing a difference between an output voltage before inserting ferroelectric nanoparticles and an output voltage after inserting the ferroelectric nanoparticles.
Figure 8:
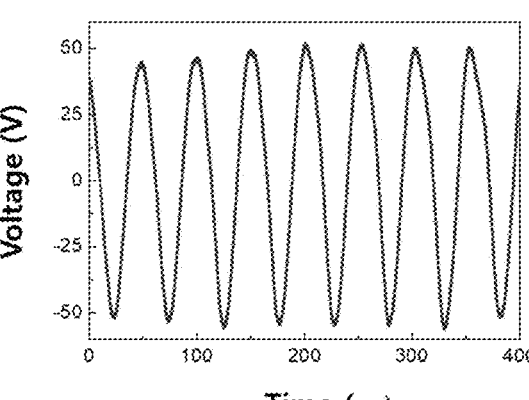

FIG. 8 is a graph showing a difference between an output voltage before inserting ferroelectric nanoparticles and an output voltage after inserting the ferroelectric nanoparticles.

It was found that the output voltage as shown in a graph on the right of FIG. 8 when the ferroelectric nanoparticles were inserted into the polymer matrix was much larger than that as shown in a graph on the left of FIG. 8 when the ferroelectric nanoparticles were not inserted into the polymer matrix.

FIG. 9 is a graph of mechanical properties of a triboelectric layer based on a concentration of ferroelectric nanoparticles.

As shown in FIG. 9, it was identified that there was no difference in the mechanical properties of the triboelectric layer when the ferroelectric nanoparticles were inserted into the polymer matrix. That is, it was identified that when the ferroelectric nanoparticles were inserted into the polymer matrix, the greater output voltage from the triboelectric energy generating device may be obtained while the mechanical properties of the triboelectric layer may be maintained to be constant.

The ultrasonic wave-based triboelectric energy generator which maintains the polarized state for a long period of time via the pressure and thus the electric field generated via the application of the external ultrasonic wave thereto may be used as an electrical energy generator for charging a battery of a body-implantable medical device such as a heart pacemaker that requires periodic battery replacement. This is expected to have great technical significance.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A triboelectric energy generating device driven by an ultrasonic wave, the device comprising:

a first triboelectric layer comprising a conductive material and serving as a first electrode;

a second triboelectric layer comprising a ferroelectric composite, wherein the second triboelectric layer faces and is spaced apart from a friction face of the first triboelectric layer; and an outer wall surrounding at least a portion of each of the first triboelectric layer and the second triboelectric layer, the outer wall comprising a porous time-limited material, wherein the ferroelectric composite includes a polymer matrix and polarized ferroelectric particles dispersed in the polymer matrix, wherein the ultrasonic wave generates acoustic cavitation bubbles from gas nuclei present in a fluid and destroys the bubbles such that when the ultrasonic wave is applied to the device, the first triboelectric layer and the second triboelectric layer repeatedly contact and are spaced from each other to generate triboelectric energy, and wherein when the ultrasonic wave is applied to the device, an electric field is generated to maintain a polarized state of the ferroelectric particles to maintain an output of the triboelectric energy.

2. The device of claim 1, wherein when the ultrasonic wave is applied to the device, a pressure is momentarily concentrated at an interface between the polymer matrix and the ferroelectric particles due to a difference between acoustic impedances of the polymer matrix and the ferroelectric particles, and thus the electric field is generated by the pressure, and thus, under the electric field, electric charges are trapped in a defect to induce a stronger polarization and the electric field maintains the polarized state of the ferroelectric particles.

3. The device of claim 1, wherein the polymer matrix includes a ferroelectric polymer, and wherein the ferroelectric particles are subjected to polarization treatment.

4. The device of claim 1, further comprising a second electrode disposed opposite to a friction face of the second triboelectric layer.

5. A charging device insertable into a human body for charging a medical device implanted into the human body, wherein the charging device includes the triboelectric energy generating device of claim 1, wherein when the charging device is inserted into the human body, the ultrasonic wave from an outside is applied to the triboelectric energy generating device of the charging device to generate the electric field to maintain the polarized state of the ferroelectric particles to maintain the output of the triboelectric energy.

6. A triboelectric energy generating device driven by an ultrasonic wave, the device comprising:

a first triboelectric layer comprising a non-conductive material;

a first electrode disposed on a non-friction face of the first triboelectric layer;

a second triboelectric layer comprising a ferroelectric composite, wherein the second triboelectric layer faces and is spaced apart from a friction face of the first triboelectric layer, wherein the friction face and the non-friction face of the first triboelectric layer are opposite to each other; and an outer wall surrounding at least a portion of each of the first triboelectric layer and the second triboelectric layer, the outer wall comprising a porous time-limited material, wherein the ferroelectric composite includes a polymer matrix and polarized ferroelectric particles dispersed in the polymer matrix, wherein the ultrasonic wave generates acoustic cavitation bubbles from gas nuclei present in a fluid and destroys the bubbles such that when the ultrasonic wave is applied to the device, the first triboelectric layer and the second triboelectric layer repeatedly contact and are spaced from each other to generate triboelectric energy, and wherein when the ultrasonic wave is applied to the device, an electric field is generated to maintain a polarized state of the ferroelectric particles to maintain an output of the triboelectric energy.

7. The device of claim 6, wherein when the ultrasonic wave is applied to the device, a pressure is momentarily concentrated at an interface between the polymer matrix and the ferroelectric particles due to a difference between acoustic impedances of the polymer matrix and the ferroelectric particles, and thus the electric field is generated by the pressure, and thus, under the electric field, electric charges are trapped in a defect to induce a stronger polarization and the electric field maintains the polarized state of the ferroelectric particles.

8. The device of claim 6, wherein the polymer matrix includes a ferroelectric polymer, and wherein the ferroelectric particles are subjected to polarization treatment.

9. The device of claim 6, further comprising a second electrode disposed opposite to a friction face of the second triboelectric layer.

10. A charging device insertable into a human body for charging a medical device implanted into the human body, wherein the charging device includes the triboelectric energy generating device of claim 6, wherein when the charging device is inserted into the human body, the ultrasonic wave from an outside is applied to the triboelectric energy generating device of the charging device to generate the electric field to maintain the polarized state of the ferroelectric particles to maintain the output of the triboelectric energy.

* * * * *